US012795782B2

(12) United States Patent
Lee et al.

(10) Patent No.: US 12,795,782 B2
(45) Date of Patent: Nov. 10, 2026

(54) HEAT GENERATING FABRIC

(71) Applicants: Sung Man Lee, Dalseong-gun (KR); Dong Ho Lee, Suseong-gu (KR); Weon Cheol Song, Dalseong-gun (KR)

(72) Inventors: Sung Man Lee, Dalseong-gun (KR); Dong Ho Lee, Suseong-gu (KR); Weon Cheol Song, Dalseong-gun (KR)

( * ) Notice: Subject to any disclaimer, the term of this patent is extended or adjusted under 35 U.S.C. 154(b) by 1030 days.

(21) Appl. No.: 17/787,962

(22) PCT Filed: Jul. 21, 2020

(86) PCT No.: PCT/KR2020/009569
§ 371 (c)(1),
(2) Date: Jun. 22, 2022

(87) PCT Pub. No.: WO2021/132825
PCT Pub. Date: Jul. 1, 2021

(65) Prior Publication Data

US 2023/0054505 A1 Feb. 23, 2023

(30) Foreign Application Priority Data

Dec. 26, 2019 (KR) ........................ 10-2019-0175336

(51) Int. Cl.
*H05B 3/14* (2006.01)
*H05B 3/34* (2006.01)

(52) U.S. Cl.
CPC ............. *H05B 3/145* (2013.01); *H05B 3/347* (2013.01)

(58) Field of Classification Search
CPC ... H05B 2203/032; H05B 3/145; H05B 3/347
See application file for complete search history.

(56) References Cited

U.S. PATENT DOCUMENTS 4,136,697 A * 1/1979 Smith ........................ D01F 2/08 524/36
4,567,094 A * 1/1986 Levin ....................... B29C 70/16 139/426 TW
4,590,122 A * 5/1986 Levin ...................... D03D 15/25 428/408

(Continued)

FOREIGN PATENT DOCUMENTS

JP 2769889 B2 6/1998
KR 1019870003950 5/1987

(Continued)

OTHER PUBLICATIONS

International Search Report for PCT /KR2020/009569 mailed Nov. 6, 2020.

*Primary Examiner* — Ibrahime A Abraham
*Assistant Examiner* — Joe E Mills, Jr.
(74) *Attorney, Agent, or Firm* — Schmeiser Olsen PLLC

(57) ABSTRACT

A heat generating fabric is provided, and more specifically a heat generating fabric that exhibits excellent heating characteristics, has a uniform temperature distribution, has excellent flexibility such that when applied to a surface to be fixed having a step difference, it has excellent adhesion and heat insulation performance at the same time, has an effect of transmitting the temperature to the inside of an object for the purpose of temperature increase, shows very little change in physical properties even after heating and shows an effect of excellent durability.

18 Claims, 4 Drawing Sheets

(56) References Cited

U.S. PATENT DOCUMENTS

| | | | | | |
|---|---|---|---|---|---|
| 5,422,462 | A * | 6/1995 | Kishimoto | H05B 1/0272 219/545 |
| 10,801,580 | B2 * | 10/2020 | Imaoka | F16G 5/20 |
| 2009/0061712 | A1 * | 3/2009 | Kuang | D03D 27/10 442/205 |
| 2009/0246521 | A1 * | 10/2009 | Swift | D06M 23/16 428/401 |
| 2010/0051605 | A1 * | 3/2010 | Bode | B60N 2/5685 297/180.12 |
| 2013/0260630 | A1 * | 10/2013 | Ito | D03D 1/0088 442/205 |
| 2020/0009825 | A1 * | 1/2020 | Waina | B32B 27/08 |

FOREIGN PATENT DOCUMENTS

| | | | |
|---|---|---|---|
| KR | 10-0411196 | B1 | 12/2003 |
| KR | 10-2005-0081314 | A | 8/2005 |
| KR | 10-2011-0109715 | A | 10/2011 |
| KR | 10-1363458 | B1 | 2/2014 |
| KR | 10-2017-0043789 | A | 4/2017 |
| KR | 10-2109019 | B1 | 5/2020 |
| WO | 2016-158955 | A1 | 10/2015 |

* cited by examiner

HEAT GENERATING FABRIC

CROSS-REFERENCE TO RELATED APPLICATIONS

This application claims priority to PCT/KR2020/009569, having a filing date of Jul. 21, 2020, which claims priority to Korean Patent Application No. 10-2019-0175336, having a filing date Dec. 26, 2019, the entire contents both of which are hereby incorporated by reference.

FIELD OF TECHNOLOGY

The following relates to a heat generating fabric, and more specifically to a heat generating fabric that exhibits excellent heating characteristics, has a uniform temperature distribution, has excellent flexibility such that when applied to a surface to be fixed having a step difference, it has excellent adhesion and heat insulation performance at the same time, has an effect of transmitting the temperature to the inside of an object for the purpose of temperature increase, shows very little change in physical properties even after heating and shows an effect of excellent durability.

BACKGROUND

Generally, the examples of a heat generating fabric include a mesh-type heating element fabric in the form of a planar heating element that generates heat by electrical characteristics, and a heat generating fabric in which a heating wire is disposed in a polyethylene foam for heat insulation and insulation effects inside a mat and an electrical insulator sheet is laminated on the heating wire, and recently, demands for the heat generating fabric are rapidly increasing, such as automobile seats, beddings, patient beddings and the like, and thus, the industrial field of the heat generating fabric is rapidly expanding.

Such a heat generating fabric is mainly formed by arranging metallic conducting wires at appropriate intervals and arranging along various paths like a hot water pipe is arranged in a heating chamber, covering with a cover and then connecting a power source to heat.

Meanwhile, in the case of the conventional heat generating fabric, there have been problems in that predetermined heating characteristics are not exhibited, uniform temperature distribution is not possible, flexibility is not good such that when the heat generating fabric is applied to a surface to be fixed having a step difference, adhesion is not good, insulation performance is not good, temperature is not transferred to the inside of an object for the purpose of temperature increase, change in the physical properties is large after heating, and durability is not good.

Accordingly, the situation is that there is an urgent need to develop a heat generating fabric that exhibits excellent heating characteristics, has a uniform temperature distribution, has excellent flexibility such that when applied to a surface to be fixed having a step difference, it has excellent adhesion and heat insulation performance at the same time, has an effect of transmitting the temperature to the inside of an object for the purpose of temperature increase, shows very little change in physical properties even after heating and shows an effect of excellent durability.

SUMMARY

An aspect relates to a heat generating fabric that exhibits excellent heating characteristics, has a uniform temperature distribution, has excellent flexibility such that when applied to a surface to be fixed having a step difference, it has excellent adhesion and heat insulation performance at the same time, has an effect of transmitting the temperature to the inside of an object for the purpose of temperature increase, shows very little change in physical properties even after heating and shows an effect of excellent durability.

In order to solve the aforementioned problems, embodiments of the present invention provide a heat generating fabric, including a carbon-based fiber for generating heat when an electric current is applied, wherein the carbon-based fiber simultaneously satisfies Conditions (1) and (2) below:

$$0.165<(b+e)/(a+c+d)\leq 1.8 \quad (1)$$

$$0.4\leq d/e\leq 4.5, \quad (2)$$

wherein a is the tensile strength (g/d) of the carbon-based fiber, b is the moisture content (%) of the carbon-based fiber, c is the wet tensile strength (g/d) of the carbon-based fiber, d is the wet modulus (g/d) of the carbon-based fiber, and e is the wet elongation (%) of the carbon-based fiber.

According to an exemplary embodiment of the present invention, the carbon-based fiber may further satisfy Condition (3) below:

$$0.95\leq c/a\leq 1.05. \quad (3)$$

In addition, the carbon-based fiber may have a tensile strength of 2 to 9 g/d, a moisture content of 3% or less, a wet tensile strength of 2 to 9 g/d, a wet modulus of 15 to 40 g/d and a wet elongation of 10 to 30%.

In addition, the carbon-based fiber may further satisfy Conditions (4) and (5) below:

$$(f^2+g^3)^{1/2}/h\leq 1.3 \quad (4)$$

$$|f\times g|/h^{1/2}\leq 8.3, \quad (5)$$

wherein f is the fiber dimensional change ratio (%) of the carbon-based fiber, g is the thermal stress (N) of the carbon-based fiber, and h is the resistance (kΩ) of the carbon-based fiber.

In addition, the carbon-based fiber may have a fiber dimensional change ratio of −5% or more, a thermal stress of 5N or less and a resistance of 10 to 500 kΩ.

In addition, when 220V AC voltage is applied, the time for the temperature of the heat generating fabric to be 40° C. or higher may be 30 seconds to 5 minutes.

In addition, when 220V AC voltage is applied, the time for the temperature of the heat generating fabric to be 70° C. or higher may be 10 to 50 minutes.

In addition, when 220V AC voltage is applied, the temperature of the heat generating fabric may be 80° C. or higher, after 1 hour has elapsed In addition, the carbon-based fiber may include a fiber; and a carbon-doping layer formed on at least a part of the surface of the fiber and including a binder and carbon particles fixed to the binder.

In addition, the carbon-based fiber may have a fineness of 100 to 3,500 De.

In addition, the carbon-based fiber may have a Young's modulus of 15 to 40 g/d and an elongation of 10 to 30%.

In addition, the heat generating fabric may further include at least one connection part through which an electric current flows from the outside In addition, the heat generating fabric may include warp; and weft, wherein the carbon-based fiber is included in any one or more of the warp and weft.

In addition, one or more strands of the carbon-based fiber may be disposed per 1 inch in the disposition direction of any one or more of the warp and weft.

In addition, the warp and weft may be arranged to be intertwined, or the weft may be disposed above or below the warp.

In addition, the heat generating fabric may further include ground yarn provided to weave the warp and weft.

In addition, the ground yarn may have a fineness of 30 to 350 De.

In addition, the melting point or softening point of the ground yarn may be 190° C. or lower.

In addition, the warp and weft may each independently have a fineness of 100 to 3,500 De.

In addition, the warp and weft each independently may further include at least one selected from the group consisting of a conductive fiber including at least one selected from the group consisting of a tinned copper wire, a nichrome wire, an iron chromium wire, a copper nickel wire and a stainless steel wire, and a polyester fiber.

In addition, when the warp and weft are arranged to be intertwined, 1 to 60 strands of the warp per 1 inch in the warp direction and 1 to 60 strands of the weft per 1 inch in the weft direction may be included, and when the weft is disposed above or below the warp, 1 to 30 strands of the warp per 1 inch in the warp direction and 1 to 30 strands of the weft per 1 inch in the weft direction may be included.

The heat generating fabric according to embodiments of the present invention exhibits excellent heating characteristics, has a uniform temperature distribution, has excellent flexibility such that when applied to a surface to be fixed having a step difference, it has excellent adhesion and heat insulation performance at the same time, has an effect of transmitting the temperature to the inside of an object for the purpose of temperature increase, shows very little change in physical properties even after heating and shows an effect of excellent durability.

BRIEF DESCRIPTION

Some of the embodiments will be described in detail, with reference to the following figures, wherein like designations denote like members, wherein.

DETAILED DESCRIPTION

Figure 1:
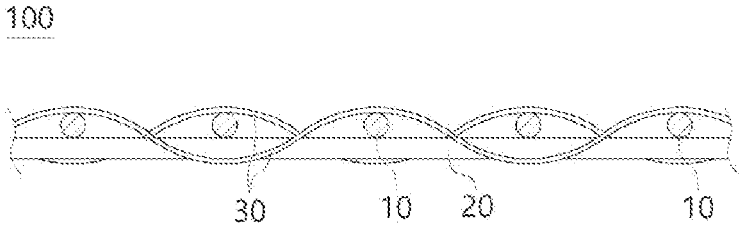
FIG. 1 is a cross-sectional view of the heat generating fabric according to an exemplary embodiment of the present invention.
Figure 2:
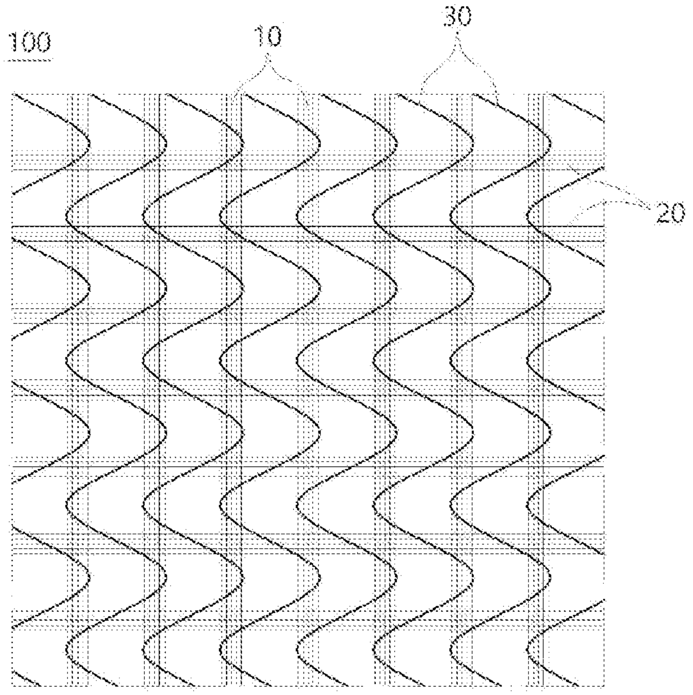
FIG. 2 is a top view showing the arrangement of ground yarn in the heat generating fabric according to an exemplary embodiment of the present invention.
Figure 3:
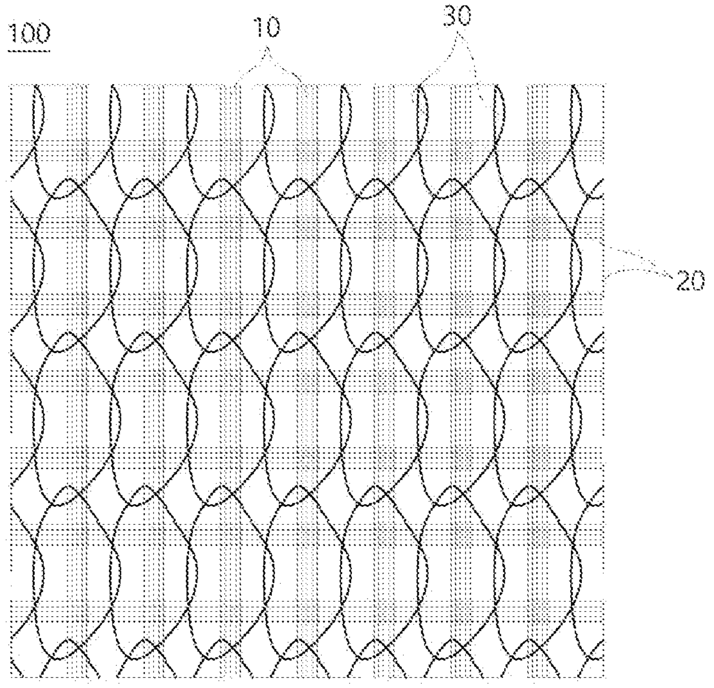
FIG. 3 is a top view showing the arrangement of ground yarn in the heat generating fabric according to another exemplary embodiment of the present invention.

Hereinafter, an exemplary embodiment of the present invention will be described in detail so that a person of ordinary skill in the art can easily practice embodiments of the present invention. The present invention may be embodied in many different forms and is not limited to the exemplary embodiment described herein.

The heat generating fabric according to an exemplary embodiment of the present invention is implemented by including a carbon-based fiber for generating heat when an electric current is applied.

Meanwhile, before describing each configuration of the heat generating fabric of embodiments of the present invention, the reasons why the carbon-based fiber of the heat generating fabric according to embodiments of the present invention must simultaneously satisfy Conditions (1) and (2) will be explained.

When the tensile strength and/or wet tensile strength of the carbon-based fiber is low, the durability may be lowered, and when tensile strength is high, the flexibility may be lowered such that when applied to a surface to be fixed having a step difference, the adhesion may be lowered. In addition, when the moisture content of the carbon-based fibers is high, changes in physical properties may occur after heating, and the durability may be lowered. In addition, when the wet modulus of the carbon-based fiber is low or high, the flexibility may be lowered such that when applied to a surface to be fixed having a step difference, the adhesion may be lowered, and the durability may be lowered. In addition, when the wet elongation of the carbon-based fiber is low or high, the flexibility may be lowered such that when applied to a surface to be fixed having a step difference, the adhesion may be lowered, and the durability may be lowered.

Accordingly, the carbon-based fiber provided in the heat generating fabric according to embodiments of the present invention simultaneously satisfies Conditions (1) and (2) below.

As Condition (1), $0.165 \le (b+e)/(a+c+d) \le 1.8$, and $0.27 \le (b+e)/(a+c+d) \le 1.3$, and as Condition (2), $0.4 \le d/e \le 4.5$, and$0.63 \le d/e \le 2.7$. In this case, a is the tensile strength (g/d) of the carbon-based fiber, b is the moisture content (%) of the carbon-based fiber, c is the wet tensile strength (g/d) of the carbon-based fiber, d is the wet modulus (g/d) of the carbon-based fiber, and e is the wet elongation (%) of the carbon-based fiber.

If $(b+e)/(a+c+d)$ is less than 0.165 in Condition (1) above, the flexibility may be lowered such that when applied to a surface to be fixed having a step difference, the adhesion may be lowered, and the durability may be lowered, and if $(b+e)/(a+c+d)$ is more than 1.8 in Condition (1) above, the flexibility may be lowered such that when applied to a surface to be fixed having a step difference, the adhesion may be lowered, and the durability may be lowered, and changes in physical properties may occur after heating.

In addition, if d/e is less than 0.4 or d/e is more than 4.5 in Condition (2) above, the flexibility may be lowered such that when applied to a surface to be fixed having a step difference, the adhesion may be lowered, and the durability may be lowered.

Meanwhile, the carbon-based fiber may further satisfy Condition (3) below.

As Condition (3), $0.95 \le c/a \le 1.05$, and $0.97 \le c/a \le 1.03$. If c/a is less than 0.95 or more than 1.05, the durability may be lowered.

Hereinafter, each configuration of the heat generating fabric of embodiments of the present invention will be described.

First, a carbon-based fiber will be described.

The carbon-based fiber may have a tensile strength of 2 to 9 g/d to satisfy Conditions (1) and (2) above, and a tensile strength of 2.5 to 8 g/d. If the tensile strength of the carbon-based fiber is less than 2 g/d, the durability may be lowered, and if the tensile strength is more than 9 g/d, the flexibility may be lowered such that and when applied to a surface to be fixed having a step difference, the adhesion may be lowered. In this case, the tensile strength can be measured under the conditions of a grip distance of 250 mm and a speed of 250 mm/min through the KS K 0412: 2016 (filament yarn) standards.

In addition, the carbon-based fiber may have a moisture content of 3% or less to satisfy Condition (1) above, and preferably, a moisture content of 2.5% or less. If the moisture content of the carbon-based fiber is more than 3%, changes in physical properties may occur after heating, and the durability may be lowered. In this case, the moisture content can be measured through the KS K 0220: 2016 (oven method) standards.

In addition, the carbon-based fiber may have a wet tensile strength of 2 to 9 g/d to satisfy Conditions (1) and (3) above, and preferably, a wet tensile strength of 2.5 to 8 g/d. If the wet tensile strength of the carbon-based fiber is less than 2 g/d, the durability may be lowered, and if the wet tensile strength is more than 9 g/d, the flexibility may be lowered such that when 0 applied to a surface to be fixed having a step difference, the adhesion may be lowered. In this case, the wet tensile strength can be measured under the conditions of a grip distance of 250 mm and a speed of 250 mm/min through the KS K 0412: 2016 (filament yarn) standards.

In addition, the carbon-based fiber may have a wet modulus of 15 to 40 g/d to satisfy Conditions (1) and (2) above, and preferably, a wet modulus of 17 to 35 g/d. If the wetting modulus of the carbon-based fiber is less than 15 g/d or more than 40 g/d, the flexibility may be lowered such that when applied to a surface to be fixed having a step difference, the adhesion may be lowered, and the durability may be lowered.

In addition, the carbon-based fiber may have a wet elongation of 10 to 30%, to satisfy Conditions (1) and (2), and preferably, 15 to 25%. If the wet elongation of the carbon-based fiber is less than 10% or more than 30%, the flexibility may be lowered such that when applied to a surface to be fixed having a step difference, the adhesion may be lowered, and the durability may be lowered. In this case, the wet elongation can be measured under the conditions of a grip distance of 250 mm and a speed of 250 mm/min through the KS K 0412: 2016 (filament yarn) standards.

Meanwhile, the carbon-based fiber may further satisfy Conditions (4) and (5) below.

As Condition (4), $(f^2g^3)/2 \leq h \leq 1.3$, and preferably, $(f^2+g^3)^{1/2}/h \leq 0.35$, and as Condition (5), $|f \times g|/h^{1/2} \leq 8.3$ and preferably, $|f \times g|/h^{1/2} \leq 2.3$. In this case, f is the fiber dimensional change ratio (%) of the carbon-based fiber, g is the thermal stress (N) of the carbon-based fiber, and h is the resistance (kΩ) of the carbon-based fiber.

If $(f^2+g^3)^{1/2}/h$ is more than 1.3 in Condition (4) above, or if $|f \times g|/h^{1/2}$ is more than 8.3 in Condition (5) above, there may be problems in that changes in physical properties increase after heating, and the durability may be lowered, and a problem may occur in which it is not possible to achieve a uniform temperature distribution to a desired level.

The carbon-based fiber may have a fiber dimensional change ratio of −5% or more to satisfy Conditions (4) and (5) above, and preferably, a fiber dimensional change ratio of −3% or more. If the fiber dimensional change ratio of the carbon-based fiber is less than −5%, there may be a problem in that changes in physical properties increase after heating, and a problem may occur in which the durability is lowered. In this case, the fiber dimensional change ratio can be measured under the conditions of 100° C. and 30 minutes according to the KS K 0215:2012(7.12.(1).B) standards.

In addition, the carbon-based fiber may have a thermal stress of 5N or less to satisfy Conditions (4) and (5) above, and preferably, a thermal stress of 3N or less. If the thermal stress of the carbon-based fiber is more than 5N, there may be a problem in that changes in physical 0 properties increase after heating, and a problem may occur in which the durability is lowered. In this case, the thermal stress can be measured under the conditions of 200° C. and 120 seconds according to the ASTM D 5591: 2011 standards.

In addition, the carbon-based fiber may have a resistance of 10 to 500 kΩ to satisfy Conditions (4) and (5) above, and the resistance may be 20 to 450 kΩ. If the resistance of the carbon-based fiber is less than 10 kΩ there may be a problem that it is not possible to achieve a uniform temperature distribution at a desired level, and if the resistance is more than 500 kΩ, a problem may occur in which it is not possible to heat to a desired level when an electric current is applied.

In addition, the carbon-based fiber may have a Young's modulus of 15 to 40 g/d, and preferably, a Young's modulus of 17 to 35 g/d. If the Young's modulus of the carbon-based fiber is less than 15 g/d, or if the Young's modulus is more than 40 g/d, the flexibility may be lowered such that when applied to a surface to be fixed having a step difference, the adhesion may be lowered, and the durability may be lowered.

In addition, the carbon-based fiber may have an elongation of 10 to 30%, and preferably, an elongation of 15 to 25%. If the elongation of the carbon-based fiber is less than 10% or more than 30%, the flexibility may be lowered such that when applied to a surface to be fixed having a step difference, the adhesion may be lowered, and the durability may be lowered.

Meanwhile, since the heat generating fabric according to embodiments of the present invention includes a carbon-based fiber, it is possible to achieve the effect of transferring the temperature to the inside of an object for the purpose of temperature increase due to the far-infrared emission of the carbon-based fiber. Specifically, the carbon-based fiber may have a far-infrared emissivity of 70% or more at a wavelength of 5 to 20 μm, preferably, a far-infrared emissivity of 80% or more at a wavelength of 5 to 20 μm, anda far-infrared emissivity of 90% or more at a wavelength of 5 to 20 μm. If the far-infrared emissivity of the carbon-based fiber at a wavelength of 5 to 20 μm is less than 70%, there may be a problem in that the temperature is not transmitted to the inside of an object for the purpose of temperature increase.

In addition, the carbon-based fiber may have a far-infrared radiation energy of $1\times10^2$ W/m²·μm or more at 30 to 45° C., and more preferably, a far-infrared radiation energy of $3\times10^2$ W/m² μm or more at 30 to 45° C. More preferablyIn an embodiment, the far-infrared radiation energy may be $3\times10^2$ W/m² μm or more at 30 to 45° C. If the far-infrared radiation energy of the carbon-based fiber at 30 to 45° C. is less than $1.0\times10^2$ W/m² μm, there may be a problem in that the temperature is not transmitted to the inside of an object for the purpose of temperature increase.

In addition, the carbon-based fiber may have a fineness of 100 to 3,500 De, and more preferably, a fineness of 150 to 3,000 De. If the fineness of the carbon-based fiber is less than 100 De, there may be a problem in that the heating performance is deteriorated, and problems may occur in which it is not possible to exhibit a uniform temperature distribution and the durability is lowered. In addition, if the fineness is more than 3,500 De, the flexibility may be lowered such that when applied to a surface to be fixed having a step difference, the adhesion may be lowered, and a problem may occur in which it is not possible to exhibit a uniform temperature distribution.

Meanwhile, the carbon-based fiber means all of a carbon fiber alone, a fiber having carbon particles on at least a part of the surface thereof, a fiber mixed with a carbon fiber, a fiber covered on a carbon fiber, a carbon fiber coated with a predetermined resin on at least a part of the surface thereof, a fiber including a carbon component and the like.

In an embodiment, the carbon-based fiber provided in the heat generating fabric according to embodiments of the present invention may include a fiber and a carbon doping layer formed on at least a part of the surface of the fiber.

In this case, the fiber may be used without limitation as long as it is a fiber commonly used in the art, and it may preferably be a polyester-based fiber, a polyolefin-based fiber, a polyamide-based fiber, an acrylate-based fiber and the like, and more preferably, a polyester-based fiber may be used. However, as long as it is a component that can satisfy the above-described physical properties of the carbon-based fiber including the carbon doping layer, it can be used without limitation, and thus, embodiments of the present invention does not particularly limit the same.

In addition, as the carbon doping layer may be formed through a composition for forming a carbon doping layer including carbon particles and a binder, the carbon doping layer may include a binder and carbon particles fixed to the binder.

The binder may be used without limitation as long as it can be commonly used to fix the fixed particles in the art, and preferably, it may include one or more selected from the group consisting of a natural binder, an inorganic binder and an organic binder, and more preferably, it may include one or more selected from the group consisting of an inorganic binder and an organic binder, and still more preferably, it may include one or more selected from the group consisting of an acrylic binder, a urethane-based binder, a fluorine-based binder, a silicone-based binder, a styrene-based binder, an epoxy-based binder and a phenol-based binder, and still more preferably, the use of an acrylic binder and/or a urethane-based binder among the organic binders may be more advantageous in that the heat generating fabric according to embodiments of the present invention exhibits desired effects, because the carbon-based fiber exhibits the above-described physical properties.

In addition, the carbon particles may be used without limitation as long as they are carbon materials commonly used in the art, and preferably, the carbon particles may include one or more selected from the group consisting of carbon nanotubes, graphene, carbon fibers, carbon black, soil-like graphite, pulled graphite, expanded graphite and artificial graphite, and more preferably, the carbon particles may include one or more selected from the group consisting of carbon nanotubes, graphene, carbon fibers, carbon black, artificial graphite and pulled graphite, and it may be more advantageous in that the heat generating fabric according to embodiments of the present invention exhibits desired effects, because the carbon-based fiber exhibits the above-described physical properties.

In addition, the carbon doping layer-forming composition may further include at least one selected from the group consisting of a solvent, a dispersant, a thickener and a coupling agent.

In this case, as the solvent, dispersant, thickener and coupling agent can be used without limitation as long as they are a solvent, a dispersant, a thickener and a coupling agent that can be commonly used in the art, respectively, embodiments of the present invention does not particularly limit the same.

Meanwhile, the heat generating fabric according to an exemplary embodiment of the present invention may be implemented by including warp; and weft, and including the carbon-based fiber in any one or more of the warp and weft.

Before describing the warp and weft of the heat generating fabric according to embodiments of the present invention, the arrangement width of the above-described carbon-based fiber in the heat generating fabric will be described.

The carbon-based fiber may be included in any one or more of the warp and weft, and preferably, in both of the warp and weft. In addition, the carbon-based fiber may be arranged in one or more strands, preferably, two or more strands per 1 inch in the disposition direction of any one or more of the warp and weft. If the carbon-based fiber is arranged at less than one strand per 1 inch in the disposition direction of any one or more of the warp and weft, it is not possible to have a uniform temperature distribution to a desired level, and a problem may occur in which the heat insulation performance is deteriorated.

In addition, the heat generating fabric according to another exemplary embodiment of the present invention may further include a conductive fiber in any one or more of the warp and weft, and preferably, in both of the warp and weft. In this case, the conductive fiber and the carbon-based fiber may be arranged in a total of one or more strands and preferably, a total of two or more strands per 1 inch in any one or more of the warp and weft. If the conductive fiber and the carbon-based fiber are arranged in a total of less than one strand per 1 inch in any one or more of the warp and weft, it is not possible to have a uniform temperature distribution to a desired level, and a problem may occur in which the heat insulation performance is deteriorated.

Meanwhile, the conductive fiber may be used without limitation as long as it is a conductive fiber commonly used in the art, and preferably, it may include at least one selected from the group consisting of a tinned copper wire, a nichrome wire, an iron chromium wire, a copper nickel wire and a stainless steel wire.

Hereinafter, the warp, weft and heat generating fabric of the heat generating fabric according to embodiments of the present invention will be described.

The warp may include a carbon-based fiber as described above, and as it may further include a conductive fiber, it may exhibit a heating function by electrically communicating with a carbon-based fiber that may be included in the weft to be described below and/or a conductive fiber that may be further included.

Meanwhile, the warp may further include a polyester fiber in addition to the carbon-based fiber and conductive fiber described above.

The warp is not limited as long as it has a fineness that can be commonly used in the art, and preferably, the fineness may be 100 to 3,500 De, and more preferably, the fineness may be 150 to 3,000 De. If the fineness of the warp is less than 100 De, the heating performance may be deteriorated as the heat insulation performance is deteriorated, and the durability may decrease. In addition, if the fineness is more than 3,500 De, the flexibility may be lowered such that when applied to a surface to be fixed having a step difference, the adhesion may be lowered.

In addition, as the weft may include a carbon-based fiber as described above and may further include a conductive fiber, it may exhibit a heating function by electrically communicating with a carbon-based fiber that may be included in the warp and/or a conductive fiber that may be further included.

Meanwhile, the weft may further include a polyester fiber in addition to the carbon-based fiber and conductive fiber described above.

The weft is not limited as long as it has a fineness that can be commonly used in the art, and preferably, the fineness may be 100 to 3,500 De, and more preferably, the fineness may be 150 to 3,000 De. If the fineness of the weft is less than 100 De, there may be a problem in that the heating performance may be deteriorated as the heat insulation performance is deteriorated, and the durability may be lowered. In addition, if the fineness is more than 3,500 De, the flexibility may be lowered such that when applied to a surface to be fixed having a step difference, the adhesion may be lowered.

In addition, the heat generating fabric may further include ground yarn, and the ground yarn may be provided to weave the warp and weft.

The ground yarn may be used without limitation as long as it is a fiber commonly used in the art, and it may preferably include at least one selected from a nylon fiber and a PET fiber.

In addition, the melting point or softening point of the ground yarn may be lower than those of the warp and the weft described above, preferably, it may be 190° C. or lower, and more preferably, it may be 185° C. or lower. If the melting point or softening point of the ground yarn is more than 190° C., only the ground yarn may not be selectively fused through a predetermined heat treatment, and the warp and the weft may be first melted or softened, thereby causing a problem in that it is not possible to exhibit a uniform temperature distribution. Accordingly, the ground yarn provided in the heat generating fabric may be provided in a fibrous form, or may be provided as a fusion part fused through a predetermined heat treatment.

The ground yarn is not limited as long as it has a fineness that can be commonly used in the art, and preferably, the fineness may be 30 to 350 De, and more preferably, the fineness may be 50 to 300 De. If the fineness of the ground yarn is less than 30 De, the heat insulation performance may not be expressed at a desired level, and thus, there may be problems that in the heating performance may be deteriorated, and the durability may be lowered. In addition, if the fineness is more than 350 De, the flexibility may be lowered such that when applied to a surface to be fixed having a step difference, the adhesion may be lowered.

Meanwhile, the heat generating fabric according to an exemplary embodiment of the present invention may include at least one connection part to which an electric current is applied.

The connection part may be implemented without limitation by using any material that can be commonly used as a connection part in the art, and preferably, it may include at least one selected from the group consisting of the aforementioned carbon-based fiber and conductive fiber.

In addition, the connection part may be provided at one or more ends of any one or more of the warp and the weft, and preferably, it may be provided at both ends of any one or more of the warp and the weft, or may be separately provided outside by extending from the heat generating fabric.

As the heat generating fabric according to embodiments of the present invention includes the connection part, the above-described carbon-based fiber that is included in the heat generating fabric and/or the conductive fiber that may be further included are in electrical communication with each other to exhibit a heating function when an electric current is applied.

Meanwhile, in the heat generating fabric according to an exemplary embodiment of the present invention, when 220V AC voltage is applied, the time for the temperature of the heat generating fabric to be 40° C. or higher may be 30 seconds to 5 minutes, preferably, 35 seconds to 4 minutes, and more preferably, 45 seconds to 3 minutes. Further, in the heat generating fabric according to an exemplary embodiment of the present invention, when 220V AC voltage is applied, the time for the temperature of the heat generating fabric to be 70° C. or higher may be 10 minutes to 50 minutes, and preferably, 15 minutes to 35 minutes. If the time for the temperature of the heat generating fabric to be 40° C. or higher is less than 30 seconds or the time for the temperature of the heat generating fabric to be 70° C. or higher is less than 10 minutes, the heating temperature is excessively high, and thus, the heat generating fabric may be damaged and the durability and mechanical properties may be deteriorated. In addition, if the time is more than 5 minutes or the time for the temperature of the heat generating fabric to be 70° C. or higher is more than 50 minutes, problems may occur in which the heating characteristics are exhibited to a desired level, and it is not possible to achieve a uniform temperature distribution.

Further, in the heat generating fabric according to an exemplary embodiment of the present invention, when 220V AC voltage is applied, the temperature of the heat generating fabric may be 80° C. or higher after 1 hour, and preferably, after 1 hour has elapsed, the temperature of the heat generating fabric may be 83° C. or higher, and more preferably, the temperature of the heat generating fabric may be 85° C. or higher after 1 hour has elapsed. If 220V AC voltage is applied, if the temperature of the heat generating fabric is less than 80° C. after 1 hour has elapsed, the heating characteristics may not be expressed to a desired level, and a problem may occur in which it is not possible to achieve a uniform temperature distribution.

Meanwhile, the warp, weft and ground yarn provided in the heat generating fabric according to an exemplary embodiment of the present invention may be arranged such that the warp and weft are intertwined, and the ground yarn may be provided to weave the warp and weft.

First, the weave structure of the woven fabric may be subject to any one method selected from the group consisting of plain weave, twill weave, satin weave and double weave.

When the plain weave, twill weave and satin weave are referred to as three basic types of weave, the specific weaving method of each of the three basic types of weave is subject to a typical weaving method. On the basis of the three basic types of weave, the structure may be modified or a few structures may be mixed to obtain fancy weave. Examples of fancy plain weave include rib weave and basket weave, examples of fancy twill weave include elongated twill weave, broken twill weave, skip twill weave and pointed twill weave, and examples of fancy satin weave include irregular satin weave, double satin weave, satin check weave and granite satin weave. The double weave is a fabric-weaving method in which either warp or weft is doubled or both of them are doubled, and the specific method thereof may be a typical weaving method of the double weave. However, embodiments of the present invention are not limited to the description of the weave structure of the woven fabric.

When the warp and weft provided in the heat generating fabric of embodiments of the present invention are arranged to be intertwined and the ground yarn is provided to weave the warp and weft, it may include 1 to 60 strands of the warp per 1 inch in the warp direction and 1 to 60 strands of the weft per 1 inch in the weft direction, and preferably, it may include 3 to 58 strands of the warp per 1 inch in the warp direction and 3 to 58 strands of the weft per 1 inch in the weft direction. If the warp is less than 1 strand per 1 inch in the warp direction or the weft is less than 1 strand per 1 inch in the weft direction, a desired level of heat insulation performance may not be exhibited, and thus, the heating performance may be deteriorated, it is not possible to achieve a uniform temperature distribution, and the durability may be degraded. In addition, if the warp is more than 60 strands per 1 inch in the warp direction or the weft is more than 60 strands per 1 inch in the weft direction, the flexibility may be lowered such that when applied to surface to be fixed having a step difference, the adhesion may be lowered.

In addition, as illustrated in FIG. 1, the warp 10, the weft 20 and the ground yarn 30 provided in the heat generating fabric 100 according to another exemplary embodiment of the present invention may be arranged such that the weft 20 is disposed above or below the warp, and as illustrated in FIGS. 1 to 4, the ground yarn 30 may be provided to weave the warp 10 and the weft 20.

When the weft is disposed above or below the warp provided in the heat generating fabric of embodiments of the present invention and the ground yarn is provided to weave the warp and the weft, it may include 1 to 30 strands of the warp per 1 inch in the warp direction and 1 to 30 strands of the weft per 1 inch in the weft direction, and preferably, it may include 3 to 25 strands of the warp per 1 inch in the warp direction and 3 to 25 strands of the weft per 1 inch in the weft direction. If the warp is less than 1 strand per 1 inch in the warp direction or the weft is less than 1 strand per 1 inch in the weft direction, a desired level of heat insulation performance may not be exhibited, and thus, the heating performance may be deteriorated, it is not possible to achieve a uniform temperature distribution, and the durability may be deteriorated. In addition, if the warp is more than 30 strands per 1 inch in the warp direction or the weft is more than 30 strands per 1 inch in the weft direction, the flexibility may be lowered such that when applied to a surface to be fixed having a step difference, the adhesion may be lowered.

The heat generating fabric according to embodiments of the present invention exhibits a predetermined heating characteristic, has a uniform temperature distribution, has excellent flexibility such that when applied to a surface to be fixed having a step difference, it has excellent adhesion, and has an effect of excellent heat insulation performance at the same time.

Hereinafter, embodiments of the present invention will be described with reference to the following examples. In this case, the following examples are only presented to illustrate embodiments of the invention, and the scope of embodiments of the present invention are not limited by the following examples.

EXAMPLE

Example 1: Manufacture of Geat Generating Fabric

First, a carbon-based fiber having a fineness of 1,500 De and provided with a carbon 0 doping layer including carbon particles fixed to an acrylic binder and a urethane-based binder on the surface of a PET fiber was prepared. In this case, the carbon-based fiber had a resistance of 370 kΩ, a far-infrared emissivity of 90.1% at a wavelength of 5 to 20 μm as measured according to KCL-FIR-1005, a far-infrared radiation energy of $3.63\times10^{2}$ W/$m^2$ μ at 40° C., a tensile strength of 4.28 g/d as measured under the condition of a grip distance of 250 mm and a speed of 250 mm/min through the KS K 0412: 2016 (filament yarn) standards, a wet tensile strength of 4.33 g/d, a wet elongation of 20.66%, an elongation of 20.54%, a fiber dimensional change ratio of −1.2% as measured under the conditions of 100° C. and 30 minutes through the KS K 0215: 2012(7.12.(1).B) standards, a thermal stress of ON as measured under the conditions of 200° C. and 120 seconds through the ASTM D 5591: 2011 standards, a Young's modulus of 24.57 g/d, a wet modulus of 25.27 g/d and a moisture content of 0.99% as measured through the KS K 0220:2016 (oven method) standards.

Figure 4:
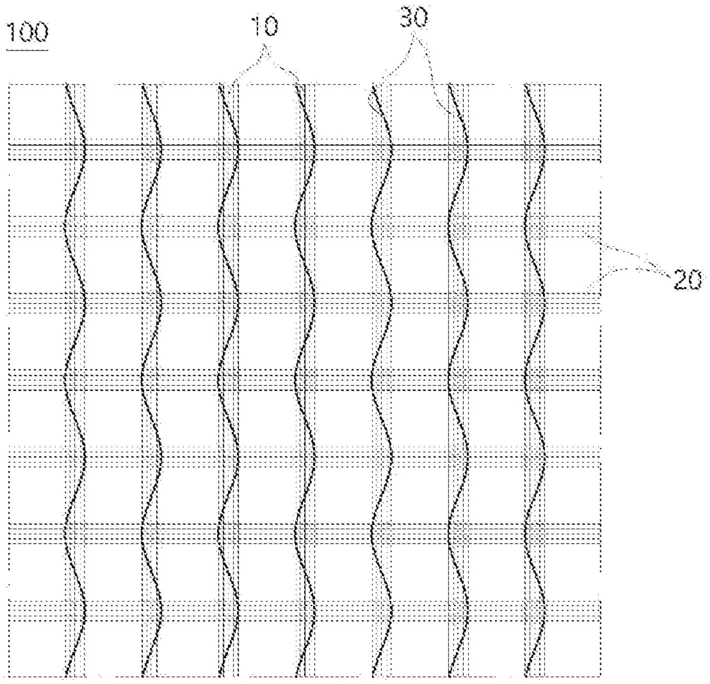
FIG. 4 is a top view showing the arrangement of ground yarn in the heat generating fabric according to still another exemplary embodiment of the present invention.

In addition, a polyester fiber having a melting point of 260° C. and a fineness of 1,000 De was supplied as the warp, and a polyester fiber having a melting point of 260° C. and a fineness of 1,000 De was supplied as the weft, wherein in order to arrange 3 strands of the carbon-based fiber per 1 inch in the disposition direction of the weft, the weft was supplied to pass through below the warp, and LM fibers having a melting point of 170° C. and a fineness of 75 De were supplied as the ground yarn such that the warp and the weft were manufactured to be woven as shown in FIG. 4, and a fabric was manufactured such that a tinned copper wire, which is a conductive fiber, was disposed as a connection part at both ends of the warp. In this case, 15 strands of the warp were disposed per 1 inch in the warp direction, and 15 strands of the weft were disposed per 1 inch in the weft direction. In addition, heat treatment was performed at a temperature of 320° C. for 1 second to fuse the ground yarn, thereby manufacturing a heat generating fabric.

<Examples 2 to 28 and Comparative Examples 1 to 7

Heat generating fabrics as shown in Tables 1 to 6 were manufactured in the same manner as in Example 1, except that the tensile strength, moisture content, wet tensile strength, fiber dimensional change ratio, thermal stress, resistance, fineness, wet modulus, wet elongation, Young's modulus, elongation and type, number of strands per 1 inch and inclusion of a carbon-based fiber were changed.

Experimental Example 1

1. Measurement of Time to Teach 40° C.

With respect to the heat generating fabrics manufactured according to the above examples and comparative examples, after applying 220V AC voltage, the temperatures of 10 random points on the heat generating fabrics manufactured according to the examples and comparative examples were measured, and the average values thereof were calculated to measure the average values of the time to reach 40° C., and the results were shown in Tables 1 to 6 below.

2. Temperature Measurement After 1 Hour when 220V AC Voltage is Applied

For the heat generating fabrics manufactured according to the above examples and comparative examples, after 1 hour had elapsed when 220V AC voltage was applied, the temperatures of 10 random points on the heat generating fabrics manufactured according to the examples and comparative examples were measured, and the average values thereof were calculated to measure the average values of the temperatures, and the results were shown in Tables 1 to 6 below.

3. Durability Evaluation

With respect to the heat generating fabrics manufactured according to the above examples and comparative examples, 10% tension and restoration in the weft direction compared to the initial length were set as 1 set, and a total of 100 sets were repeatedly performed. In this case, durability was evaluated such that when there was no abnormality, it was assigned ○ and when any problem occurred such as when any one of the warp, weft, ground yarn and carbon-based fiber was detached, when single yarn was generated, and when the amount of heat was reduced, it was assigned x, and the results were shown in Tables 1 to 6 below.

Experimental Example 2

After bonding the heat generating fabrics manufactured in the examples and comparative examples with a width and length of 2,000 mm×3,000 mm to gangform bodies consisting of a tetrahedron without vertical and horizontal dimensions in which the size of one surface was 2,500 mm×3,000 mm×3 mm in width, length and thickness such that the heat generating fabric could be joined to a partition of the gangform body, concretes were cured at −10° C. for 9 hours under the conditions of −10° C., and then, the following physical properties were measured and shown in Tables 1 to 6 below.

1. Evaluation of Concrete Curing Uniformity (Evaluation of Thermal Uniformity)

For each of the cured concretes, a sensory evaluation was performed on the concrete curing uniformity by 10 persons with more than 15 years of experience in the relevant field for 20 random points on the concrete, and concrete curing uniformity was evaluated such that when the concrete was cured at all 20 points, it was assigned ◎, and when the concrete was cured at less than 20 points and at 18 or more points, it was assigned ○, and when the concrete was cured at less than 18 points and at 15 or more points, it was assigned Δ, and when the concrete was cured at less than 15 points, it was assigned x.

2. Evaluation of Heating Performance

During concrete curing, after 90 minutes of applying 220V AC voltage, the temperatures of the gangform and the attached iron plate were measured to evaluate the heating performance.

In this case, a high temperature indicates that the heating performance was excellent, and a low temperature indicates that the heating performance was deteriorated.

3. Evaluation of Internal Curing of Concrete

After dividing each of the cured concretes in half in the vertical direction, a sensory evaluation was performed on the uniformity of concrete curing by 10 people with more than 15 years of experience in the relevant field for the central part, and the average values after evaluation were measured through a 7-point scale to evaluate the degree of internal curing of the concrete.

4. Evaluation of Change Ratio of Tensile Strength of Fabrics

Before curing the concrete, the initial tensile strength in each of the warp direction and weft direction of the fabric was measured, and after curing the concrete, the tensile strength in each of the warp direction and weft direction of the fabric was measured, and then, the change ratio of tensile strength compared to the initial tensile strength in each of the warp direction and weft direction was measured, and the average values were calculated. In this case, the change ratio of tensile strength of the fabrics was evaluated such that when the change ratio of the tensile strength after curing compared to the initial tensile strength was less than ±1%, it was assigned ○, and when it was ±1 to ±5%, it was assigned Δ, and when it was more than ±5%, it was assigned x.

Experimental Example 3: Adhesion Evaluation

After bonding the heat generating fabrics manufactured through the examples and comparative examples to gangform bodies manufactured in a stepped shape such that a facet of 3,000 mm×4,000 mm×3 mm in width, length and thickness on one side had a step difference of 30 cm so as to cover the upper surface of the gangform body, the following physical properties were measured, and the results were shown in Tables 1 to 6 below.

1. Adhesion Evaluation

After curing the concretes for 9 hours under the condition of −10° C. through the gangform bodies to which the heat generating fabrics manufactured in the examples and comparative examples were bonded, for each of the cured concretes, for 20 random points on the concrete, a sensory evaluation was performed on the uniformity of concrete curing by 10 people 5 with more than 15 years of experience in the relevant field, and adhesion was evaluated through concrete curing uniformity such that when the concrete was cured at all 20 points, it was assigned ◎, and when the concrete was cured at less than 20 points and at 18 or more points, it was assigned ○, and when the concrete was cured at less than 18 points and at 10 or more points, it was assigned Δ, and when the concrete was cured at less than 10 points, it was assigned x.

TABLE 1

| Classification | | Example 1 | Example 2 | Example 3 | Example 4 | Example 5 | Example 6 |
|---|---|---|---|---|---|---|---|
| Carbon-based fiber | Tensile strength (g/d), a | 4.28 | 0.98 | 12.17 | 2.6 | 2.32 | |
| | Moisture content (%), b | 0.99 | 2.7 | 0.65 | 2.5 | 4.4 | 2.6 |
| | Wet tensile strength (g/d), c | 4.33 | 1.02 | 12.3 | 2.67 | 2.53 | 2.89 |
| | Wet modulus (g/d), d | 25.27 | 25.31 | 24.75 | 25.30 | 26.12 | 13.59 |
| | Wet elongation (%), e | 20.66 | 20.66 | 20.42 | 20.66 | 20.69 | 31.24 |
| | Condition (1) | 0.64 | 0.86 | 0.43 | 0.76 | 0.81 | 1.75 |
| | Condition (2) | 1.22 | 1.23 | 1.21 | 1.22 | 1.26 | 0.44 |
| | Condition (3) | 1.01 | 1.041 | 1.01 | 1.027 | 1.091 | 1.01 |

TABLE 1-continued

| Classification | | Example 1 | Example 2 | Example 3 | Example 4 | Example 5 | Example 6 |
|---|---|---|---|---|---|---|---|
| | Fiber dimensional change ratio (%), f | −1.2 | −2.9 | −1.1 | −2.4 | −4.3 | −2.3 |
| | Thermal stress (N), g | 0 | 3.1 | 0 | 1.3 | 3.6 | 0 |
| | Resistance (kΩ), h | 370 | 382 | 363 | 374 | 396 | 370 |
| | Condition (4) | 0.0032 | 0.016 | 0.003 | 0.0075 | 0.02 | 0.0062 |
| | Condition (5) | 0 | 0.46 | 0 | 0.16 | 0.78 | 0 |
| | Fineness (De) | 1500 | 1500 | 1500 | 1500 | 1500 | 1500 |
| | Young's modulus (g/d) | 24.57 | 24.69 | 24.51 | 24.79 | 25.82 | 10.96 |
| | Elongation (%) | 20.54 | 20.55 | 20.40 | 20.55 | 20.64 | 35.18 |
| | Arrangement width (number of strands per 1 inch) | 3 | 3 | 3 | 3 | 3 | 3 |
| Time to reach 40° C. when 220 V AC voltage is applied | | 2 minutes 43 seconds | 3 minutes | 2 minutes 32 seconds | 2 minutes 50 seconds | 3 minutes 38 seconds | minutes 55 seconds |
| Temperature of heat generating fabric after 1 hour (° C.) | | 87 | 82 | 88 | 86 | 74 | 81 |
| Durability evaluation | | ○ | X | ○ | ○ | X | X |
| Evaluation of heating uniformity | | ◎ | ◎ | ◎ | ◎ | ◎ | ◎ |
| Evaluation of heating performance (° C.) | | 63 | 62 | 63 | 63 | 59 | 62 |
| Evaluation of internal curing of concrete | | 6.8 | 6.7 | 6.7 | 6.8 | 6.5 | 6.6 |
| Evaluation of change ratio of tensile strength of fabric | | ○ | X | ○ | ○ | X | ○ |
| Adhesion evaluation | | ◎ | ◎ | X | ◎ | ◎ | ◎ |

TABLE 2

| Classification | | Example 7 | Example 8 | Example 9 | Example 10 | Example 11 | Example 12 |
|---|---|---|---|---|---|---|---|
| Carbon-based fiber | Tensile strength (g/d), a | 3.49 | 7.50 | 7.76 | 3.14 | 2.42 | 3.11 |
| | Moisture content (%), b | 1.43 | 0.84 | 0.83 | 2.3 | 2.8 | 2.4 |
| | Wet tensile strength (g/d), c | 3.52 | 7.54 | 7.93 | 3.15 | 2.44 | 3.13 |
| | Wet modulus (g/d), d | 18.11 | 34.75 | 41.17 | 24.74 | 25.19 | 24.72 |
| | Wet elongation (%), e | 24.45 | 15.81 | 9.16 | 20.48 | 20.13 | 20.47 |
| | Condition (1) | 1.03 | 0.33 | 0.18 | 0.73 | 0.76 | 0.74 |
| | Condition (2) | 0.74 | 2.2 | 4.49 | 1.21 | 1.25 | 1.21 |
| | Condition (3) | 1.01 | 1.01 | 1.02 | 1.00 | 1.01 | 1.00 |
| | Fiber dimensional change ratio (%), f | −1.3 | −1.1 | −1.0 | −2.9 | −6.4 | −1.8 |
| | Thermal stress (N), g | 0 | 0.9 | 2.6 | 0.7 | 1.6 | 2.6 |
| | Resistance (kΩ), h | 370 | 370 | 370 | 382 | 398 | 379 |
| | Condition (4) | 0.0035 | 0.0038 | 0.012 | 0.0077 | 0.017 | 0.012 |
| | Condition (5) | 0 | 0.051 | 0.14 | 0.10 | 0.51 | 0.24 |
| | Fineness (De) | 1500 | 1500 | 1500 | 1500 | 1500 | 1500 |
| | Young's modulus (g/d) | 17.84 | 34.68 | 45.10 | 24.66 | 24.31 | 24.64 |
| | Elongation (%) | 24.41 | 15.78 | 5.71 | 20.55 | 20.56 | 20.54 |
| | Arrangement width (number of strands per 1 inch) | 3 | 3 | 3 | 3 | 3 | 3 |
| Time to reach 40° C. when 220 V AC voltage is applied | | 2 minutes 46 seconds | 2 minutes 44 seconds | 2 minutes 44 seconds | 2 minutes 50 seconds | 2 minutes 56 seconds | 2 minutes 47 seconds |
| Temperature of heat generating fabric after 1 hour (° C.) | | 82 | 82 | 83 | 86 | 79 | 87 |

TABLE 2-continued

| Classification | Example 7 | Example 8 | Example 9 | Example 10 | Example 11 | Example 12 |
|---|---|---|---|---|---|---|
| Durability evaluation | ○ | ○ | X | ○ | X | ○ |
| Evaluation of heating uniformity | ◎ | ◎ | ◎ | ◎ | ◎ | ◎ |
| Evaluation of heating performance (° C.) | 63 | 62 | 62 | 63 | 62 | 63 |
| Evaluation of internal curing of concrete | 6.7 | 6.6 | 6.1 | 6.7 | 6.7 | 6.8 |
| Evaluation of change ratio of tensile strength of fabric | ○ | ○ | ○ | ○ | Δ | ○ |
| Adhesion evaluation | ◎ | ◎ | X | ◎ | ◎ | ◎ |

TABLE 3

| Classification | | Example 13 | Example 14 | Example 15 | Example 16 | Example 17 | Example 18 |
|---|---|---|---|---|---|---|---|
| Carbon-based fiber | Tensile strength (g/d), a | 2.38 | 4.26 | 4.27 | 4.30 | 4.32 | 3.61 |
| | Moisture content (%), b | 2.9 | 1.01 | 1.00 | 0.99 | 0.98 | 2.2 |
| | Wet tensile strength (g/d), c | 2.41 | 4.31 | 4.32 | 4.34 | 4.35 | 3.53 |
| | Wet modulus (g/d), d | 24.32 | 25.23 | 25.26 | 25.03 | 24.98 | 24.97 |
| | Wet elongation (%), e | 20.58 | 20.61 | 20.65 | 20.59 | 20.62 | 20.56 |
| | Condition (1) | 0.81 | 0.64 | 0.64 | 0.64 | 0.64 | 0.71 |
| | Condition (2) | 1.18 | 1.22 | 1.22 | 1.22 | 1.21 | 1.21 |
| | Condition (3) | 1.01 | 1.01 | 1.01 | 1.01 | 1.01 | 0.978 |
| | Fiber dimensional change ratio (%), f | −2.4 | −1.3 | −1.3 | −1.2 | −1.2 | −2.4 |
| | Thermal stress (N), g | 6.1 | 0 | 0 | 0 | 0 | 3 |
| | Resistance (kΩ), h | 396 | 5 | 20 | 450 | 550 | 20 |
| | Condition (4) | 0.039 | 0.26 | 0.065 | 0.0027 | 0.0022 | 0.29 |
| | Condition (5) | 0.73 | 0 | 0 | 0 | 0 | 1.61 |
| | Fineness (De) | 1500 | 1500 | 1500 | 1500 | 1500 | 1500 |
| | Young's modulus (g/d) | 24.18 | 24.51 | 24.55 | 24.81 | 24.67 | 24.67 |
| | Elongation (%) | 20.56 | 20.48 | 20.52 | 20.56 | 20.61 | 20.56 |
| | Arrangement width (number of strands per 1 inch) | 3 | 3 | 3 | 3 | 3 | 3 |
| Time to reach 40° C. when 220 V AC voltage is applied | | 2 minutes 54 seconds | within 30 seconds | 40 seconds | 3 minutes 17 seconds | 4 minutes | minutes 51 seconds |
| Temperature of heat generating fabric after 1 hour (° C.) | | 81 | 94 | 89 | 83 | 68 | 86 |
| Durability evaluation | | X | ○ | ○ | ○ | ○ | ○ |
| Evaluation of heating uniformity | | ◎ | Δ | ◎ | ◎ | Δ | ◎ |
| Evaluation of heating performance (° C.) | | 62 | 100 or more | 75 | 52 | 43 | 62 |
| Evaluation of internal curing of concrete | | 6.7 | 2.1 | 6.6 | 6.3 | 5.5 | 6.6 |
| Evaluation of change ratio of tensile strength of fabric | | Δ | Δ | ○ | ○ | ○ | ○ |
| Adhesion evaluation | | ◎ | Δ | ◎ | ◎ | Δ | ◎ |

TABLE 4

| Classification | | Example 19 | Example 20 | Example 21 | Example 22 | Example 23 | Example 24 |
|---|---|---|---|---|---|---|---|
| Carbon-based fiber | Tensile strength (g/d), a | 3.22 | 3.64 | 2.87 | 2.03 | 2.69 | 6.96 |

TABLE 4-continued

| Classification | | Example 19 | Example 20 | Example 21 | Example 22 | Example 23 | Example 24 |
|---|---|---|---|---|---|---|---|
| | Moisture content (%), b | 3.4 | 2.1 | 2.8 | 0.62 | 0.68 | 1.64 |
| | Wet tensile strength (g/d), c | 3.29 | 3.59 | 2.89 | 2.08 | 2.77 | 7.12 |
| | Wet modulus (g/d), d | 23.84 | 24.92 | 23.74 | 39.32 | 32.56 | 20.81 |
| | Wet elongation (%), e | 20.83 | 20.57 | 20.96 | 10.93 | 18.01 | 23.48 |
| | Condition (1) | 0.8 | 0.71 | 0.81 | 0.266 | 0.49 | 0.72 |
| | Condition (2) | 1.14 | 1.21 | 1.13 | 3.6 | 1.81 | 0.89 |
| | Condition (3) | 1.02 | 0.99 | 1.01 | 1.02 | 1.03 | 1.02 |
| | Fiber dimensional change ratio (%), f | −4 | −2.9 | −6.1 | −1.0 | −1.2 | −2.7 |
| | Thermal stress (N), g | 6.8 | 2.7 | 6.7 | 0 | 0 | 1.2 |
| | Resistance (kΩ), h | 11 | 20 | 15 | 320 | 330 | 350 |
| | Condition (4) | 1.65 | 0.27 | 1.23 | 0.0031 | 0.0036 | 0.0086 |
| | Condition (5) | 8.2 | 1.8 | 10.55 | 0 | 0 | 0.17 |
| | Fineness (De) | 1500 | 1500 | 1500 | 50 | 150 | 3000 |
| | Young's modulus (g/d) | 23.60 | 24.68 | 23.52 | 39.12 | 32.33 | 20.68 |
| | Elongation (%) | 20.80 | 20.55 | 20.94 | 10.89 | 17.96 | 23.47 |
| | Arrangement width (number of strands per 1 inch) | 3 | 3 | 3 | 3 | 3 | 3 |
| Time to reach 40° C. when 220 V AC voltage is applied | | 3 minutes 1 second | 2 minutes 52 seconds | 3 minutes 12 seconds | more than 5 minutes | 3 minutes 27 seconds | 2 minutes 44 seconds |
| Temperature of heat generating fabric after 1 hour (° C.) | | 77 | 86 | 78 | 60 | 86 | 85 |
| Durability evaluation | | X | ○ | X | X | ○ | ○ |
| Evaluation of heating uniformity | | ⊚ | ⊚ | ⊚ | X | ⊚ | ⊚ |
| Evaluation of heating performance (° C.) | | 62 | 61 | 62 | 31 | 60 | 62 |
| Evaluation of internal curing of concrete | | 6.7 | 6.5 | 6.6 | 2.7 | 6.4 | 6.6 |
| Evaluation of change ratio of tensile strength of fabric | | X | ○ | X | ○ | ○ | ○ |
| Adhesion evaluation | | ⊚ | ⊚ | ⊚ | Δ | ⊚ | ⊚ |

TABLE 5

| Classification | | Example 25 | Example 26 | Comparative Example 1 | Comparative Example 2 | Comparative Example 3 | Comparative Example 4 |
|---|---|---|---|---|---|---|---|
| Carbon-based fiber | Tensile strength (g/d), a | 7.15 | 4.28 | 13.22 | 1.28 | 5.51 | 1.42 |
| | Moisture content (%), b | 1.89 | 0.99 | 0.26 | 3.6 | 0.94 | 3.4 |
| | Wet tensile strength (g/d), c | 7.30 | 4.33 | 13.47 | 1.32 | 5.58 | 1.46 |
| | Wet modulus (g/d), d | 15.43 | 25.27 | 44.1 | 14.66 | 10.48 | 39.2 |
| | Wet elongation (%), e | 27.38 | 20.66 | 10.85 | 29.38 | 34.96 | 8.43 |
| | Condition (1) | 0.98 | 0.64 | 0.157 | 1.91 | 1.66 | 0.28 |
| | Condition (2) | 0.56 | 1.22 | 4.06 | 0.5 | 0.3 | 4.65 |
| | Condition (3) | 1.02 | 1.01 | 1.02 | 1.03 | 1.01 | 1.03 |
| | Fiber dimensional change ratio (%), f | -2.9 | -1.2 | -0.9 | -4.7 | -1.0 | -4.5 |
| | Thermal stress (N), g | 1.8 | 0 | 0 | 3.9 | 0 | 3.6 |
| | Resistance (kΩ), h | 300 | 370 | 312 | 401 | 325 | 389 |
| | Condition (4) | 0.013 | 0.0032 | 0.0029 | 0.023 | 0.0031 | 0.021 |
| | Condition (5) | 0.30 | 0 | 0 | 0.92 | 0 | 0.82 |
| | Fineness (De) | 4000 | 1500 | 1500 | 1500 | 1500 | 1500 |
| | Young's modulus (g/d) | 15.21 | 24.57 | 43.87 | 14.51 | 10.35 | 38.84 |

TABLE 5-continued

| Classification | Example 25 | Example 26 | Comparative Example 1 | Comparative Example 2 | Comparative Example 3 | Comparative Example 4 |
|---|---|---|---|---|---|---|
| Elongation (%) | 27.35 | 20.54 | 10.81 | 29.34 | 34.94 | 8.42 |
| Arrangement width (number of strands per 1 inch) | 3 | 0.5 | 3 | 3 | 3 | 3 |
| Time to reach 40° C. when 220 V AC voltage is applied | 2 minutes 49 seconds | more than 5 minutes | 2 minutes 11 seconds | 3 minutes 20 seconds | 2 minutes 32 seconds | 2 minutes 50 seconds |
| Temperature of heat generating fabric after 1 hour (° C.) | 80 | 62 | 90 | 84 | 81 | 82 |
| Durability evaluation | ○ | ○ | X | X | X | X |
| Evaluation of heating uniformity | Δ | Δ | ◎ | ○ | ◎ | ◎ |
| Evaluation of heating performance (° C.) | 59 | 35 | 65 | 60 | 62 | 65 |
| Evaluation of internal curing of concrete | 5.7 | 3.2 | 6.1 | 6.3 | 6.5 | 6.2 |
| Evaluation of change ratio of tensile strength of fabric | ○ | ○ | ○ | X | ○ | ○ |
| Adhesion evaluation | X | Δ | X | X | ◎ | X |

TABLE 6

| Classification | | Comparative Example 5 | Comparative Example 6[1)] | Comparative Example 7[2)] |
|---|---|---|---|---|
| Carbon-based fiber | Tensile strength (g/d), a | — | — | — |
| | Moisture content (%), b | — | — | — |
| | Wet tensile strength (g/d), c | — | — | — |
| | Wet modulus (g/d), d | — | — | — |
| | Wet elongation (%), e | — | — | — |
| | Condition (1) | — | — | — |
| | Condition (2) | — | — | — |
| | Condition (3) | — | — | — |
| | Fiber dimensional change ratio (%), f | — | — | — |
| | Thermal stress (N), g | — | — | — |
| | Resistance (kΩ), h | — | 0.2 | 0.00005 |
| | Condition (4) | — | — | — |
| | Condition (5) | — | — | — |
| | Fineness (De) | — | 1500 | 1500 |
| | Young's modulus (g/d) | — | — | — |
| | Elongation (%) | — | — | — |
| | Arrangement width (number of strands per 1 inch) | — | 3 | 3 |
| Time to reach 40° C. when 220 V AC voltage is applied | | — | within 30 seconds | within 30 seconds |
| Temperature of heat generating fabric after 1 hour (° C.) | | — | 90 | 93 |
| Durability evaluation | | ○ | x | x |
| Evaluation of heating uniformity | | x | ○ | x |
| Evaluation of heating performance (° C.) | | −9 | 100 or more | 100 or more |
| Evaluation of internal curing of concrete | | 1.6 | 4.3 | 1 |
| Evaluation of change ratio of tensile strength of fabric | | — | x | x |
| Adhesion evaluation | | x | ○ | x |

[1)]Comparative Example 6 shows that a nichrome wire was used instead of a carbon-based fiber

[2)]Comparative Example 7 shows that a carbon fiber not including a PET fiber and a binder was used alone As can be seen from Tables 1 to 6 above, it can be confirmed that in Examples 1, 4, 7, 8, 10, 12, 15, 16, 18, 20, 23 and 24, which satisfied all of the tensile strength, moisture content, wet tensile strength, fiber dimensional change ratio, thermal stress, resistance, fineness, wet modulus, wet elongation, Young's modulus, elongation and type, number of strands per 1 inch and inclusion of the carbon-based fiber provided in the heat generating fabric according to embodiments of the present invention, the time to reach the temperature of 40° C. was fast, the temperature of the heat generating fabric increased highly after 1 hour had elapsed when AC voltage was applied, the durability and heat uniformity were excellent, the change ratio of the tensile strength of the fabric was low, the heating performance and heat insulation performance were excellent, and at the same time, the adhesion was excellent as the flexibility was excellent, and it was possible to transfer the temperature to the inside of an object for the purpose of temperature increase, compared to Examples 2, 3, 5, 6, 9, 11, 13, 14, 17, 19, 21, 22, 25 and 26 and Comparative Examples 1 to 7, which did not satisfy any one of the above.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A heat generating fabric, comprising:

a warp; and a weft;

wherein a carbon-based fiber for generating heat when an electric current is applied is included in the warp or the weft, the carbon-based fiber simultaneously satisfying Conditions (1) and (2) below:

$$0.165 \leq (b+e)/(a+c+d) \leq 1.8, \text{ and} \tag{1}$$

$$0.4 \leq d/e \leq 4.5, \tag{2}$$

wherein a is a tensile strength (g/d) of the carbon-based fiber, b is a moisture content (%) of the carbon-based fiber, c is a wet tensile strength (g/d) of the carbon-based fiber, d is a wet modulus (g/d) of the carbon-based fiber, and e is a wet elongation (%) of the carbon-based fiber;

wherein one or more strands of the carbon-based fiber are disposed per 1 inch in a disposition direction of the warp or the weft;

wherein the carbon-based fiber comprises a fiber, and a carbon-doping layer formed on at least a part of a surface of the fiber and comprising a binder and carbon particles fixed to the binder.

2. The heat generating fabric of claim 1, wherein the carbon-based fiber further satisfies Condition (3) below:

$$0.95 \leq c/a \leq 1.05. \tag{3}$$

3. The heat generating fabric of claim 1, wherein the carbon-based fiber has a tensile strength of 2 to 9 g/d, a moisture content of 3% or less, a wet tensile strength of 2 to 9 g/d, a wet modulus of 15 to 40 g/d and a wet elongation of 10 to 30%.

4. The heat generating fabric of claim 1, wherein the carbon-based fiber further satisfies Conditions (4) and (5) below:

$$(f^2+g^3)^{1/2}/h \leq 1.3 \tag{4}$$

$$|f \times g|/h^{1/2} \leq 8.3, \tag{5}$$

wherein f is the fiber dimensional change ratio (%) of the carbon-based fiber, g is the thermal stress (N) of the carbon-based fiber, and h is the resistance (kΩ) of the carbon-based fiber.

5. The heat generating fabric of claim 1, wherein the carbon-based fiber has a fiber dimensional change ratio of −5% or more, a thermal stress of 5N or less and a resistance of 10 to 500 kΩ.

6. The heat generating fabric of claim 1, wherein when 220V AC voltage is applied, a time for a temperature of the heat generating fabric to be 40° C. or higher is 30 seconds to 5 minutes.

7. The heat generating fabric of claim 1, wherein when 220V AC voltage is applied, a time for a temperature of the heat generating fabric to be 70° C. or higher is 10 to 50 minutes.

8. The heat generating fabric of claim 1, wherein when 220V AC voltage is applied, a temperature of the heat generating fabric is 80° C. or higher, after 1 hour has elapsed.

9. The heat generating fabric of claim 1, wherein the carbon-based fiber has a fineness of 100 to 3,500 De.

10. The heat generating fabric of claim 1, wherein the carbon-based fiber has a Young's modulus of 15 to 40 g/d and an elongation of 10 to 30%.

11. The heat generating fabric of claim 1, wherein the heat generating fabric comprises at least one connection part through which an electric current flows from an outside.

12. The heat generating fabric of claim 1, wherein the warp and the weft are arranged to be intertwined, or the weft is disposed above or below the warp.

13. The heat generating fabric of claim 12, wherein when the warp and the weft are arranged to be intertwined, 1 to 60 strands of the warp per 1 inch in a warp direction and 1 to 60 strands of the weft per 1 inch in a weft direction are included, and wherein when the weft is disposed above or below the warp, 1 to 30 strands of the warp per 1 inch in the warp direction and 1 to 30 strands of the weft per 1 inch in the weft direction are included.

14. The heat generating fabric of claim 1, further comprising ground yarn provided to weave the warp and the weft.

15. The heat generating fabric of claim 14, wherein the ground yarn has a fineness of 30 to 350 De.

16. The heat generating fabric of claim 1, wherein the warp and the weft each independently have a fineness of 100 to 3,500 De.

17. The heat generating fabric of claim 1, wherein the warp and the weft each independently comprise at least one selected from the group consisting of: a conductive fiber comprising at least one selected from the group consisting of: a tinned copper wire, a nichrome wire, an iron chromium wire, a copper nickel wire and a stainless steel wire, and a polyester fiber.

18. The heat generating fabric of claim 1, wherein the carbon-based fiber has a far-infrared emissivity of 70% or more at a wavelength of 5 to 20 μm.

* * * * *